(12) United States Patent
Ma et al.

(10) Patent No.: US 10,416,797 B2
(45) Date of Patent: Sep. 17, 2019

(54) DISPLAY PANEL AND DISPLAY DEVICE

(71) Applicant: SHANGHAI TIANMA MICRO-ELECTRONICS CO., LTD., Shanghai (CN)

(72) Inventors: Shaolong Ma, Shanghai (CN); Feng Lu, Shanghai (CN); Liang Liu, Shanghai (CN); Qijun Yao, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 15/809,792

(22) Filed: Nov. 10, 2017

(65) Prior Publication Data
US 2018/0081476 A1   Mar. 22, 2018

(30) Foreign Application Priority Data
Jun. 30, 2017   (CN) .......................... 2017 1 0523275

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0416* (2013.01); *G06F 2203/04105* (2013.01)

(58) Field of Classification Search
CPC ................. G06F 2203/04105; G06F 3/0414
See application file for complete search history.

(56) References Cited

U.S. PATENT DOCUMENTS

| | | | | |
|---|---|---|---|---|
| 2008/0170043 A1* | 7/2008 | Soss | .................... | G06F 3/0414 345/173 |
| 2010/0300862 A1* | 12/2010 | Tamura | ................. | G06F 3/0412 200/600 |
| 2013/0076646 A1* | 3/2013 | Krah | .................... | G06F 3/0414 345/173 |
| 2015/0002452 A1* | 1/2015 | Klinghult | .............. | G06F 3/0416 345/174 |
| 2017/0038879 A1* | 2/2017 | Hsiao | .................... | G06F 3/0414 |
| 2017/0277296 A1* | 9/2017 | Reynolds | ............... | G06F 3/044 |
| 2018/0052350 A1* | 2/2018 | Zhao | .................. | G02F 1/13338 |

* cited by examiner

*Primary Examiner* — Koosha Sharifi-Tafreshi
(74) *Attorney, Agent, or Firm* — Alston & Bird LLP

(57) ABSTRACT

A display panel and a display device are provided. The display panel includes a color filter substrate and an array substrate bonded together by non-conductive sealant. The display panel includes a display area and a non-display area around the display area. A first non-display area of the color filter substrate is provided with: at least two pressure sensors, each of which includes a signal input terminal and a signal output terminal; a plurality of power supply signal input lines, each of which is electrically connected to a respective one of the signal input terminals of the at least two pressure sensors; and a plurality of pressure signal output lines, each of which is electrically connected to a respective one of the signal output terminals of the at least two pressure sensors.

18 Claims, 18 Drawing Sheets

DISPLAY PANEL AND DISPLAY DEVICE

CROSS-REFERENCES TO RELATED APPLICATIONS

This application claims priority to Chinese patent application No. CN201710523275.7, filed on Jun. 30, 2017, the disclosure of which is incorporated herein by reference in its entirety.

TECHNICAL FIELD

The present disclosure relates to display techniques, and, in particular, to a display panel and a display device.

BACKGROUND

With the development of display techniques, display panels with touch functions are widely used in mobile terminal devices, information query devices and other display devices. Thus, a user can operate a touch display device by pressing the finger or another touching object against the signs on the display panel.

Currently, many display panels provide the dual functions of collecting touch position information and detecting touch pressure amount when performing touch functions. Thus, display panels have enriched application scope. Usually the pressure detection function in a display panel is implemented with pressure sensors. A display panel in the related art typically includes a color filter substrate and an array substrate. Usually pressure sensors are integrated into the array substrate because the array substrate is typically provided with a driver chip that provides display driving signals for display components on the array substrate and that can be shared by the pressure sensors on the array substrate. However, it has been found by those skilled in the art in study that in a non-display area of an array substrate, it is difficult to provide sufficient space to dispose pressure sensors since a display driver circuit and other circuit components need to be disposed first.

SUMMARY

The present disclosure provides a display panel and a display device, where pressure sensors in the display panel do not occupy additional space in the non-display area of the array substrate, so that the display panel provided with the pressure sensors fits the trend towards a narrow bezel.

In one aspect, an embodiment of the present disclosure provides a display panel, including: a color filter substrate and an array substrate. The color filter substrate and the array substrate are bonded together by non-conductive sealant.

The display panel includes a display area and a non-display area around the display area. The color filter substrate includes a first display area corresponding to the display area of the display panel and a first non-display area corresponding to the non-display area of the display panel.

The first non-display area of the color filter substrate includes: at least two pressure sensors, each of which comprises a signal input terminal and a signal output terminal;

a plurality of power supply signal input lines, each of which is electrically connected to a respective one of the signal input terminals of the at least two pressure sensors; and a plurality of pressure signal output lines, each of which is electrically connected to a respective one of the signal output terminals of the at least two pressure sensors.

In a second aspect, an embodiment of the present disclosure provides a display device including the above display panel.

In the display panel and display device provided by the embodiments of the present disclosure, the display panel includes a color filter substrate and an array substrate disposed opposite to each other and the color filter substrate and the array substrate are bonded together by non-conductive sealant, and the display panel includes a display area and a non-display area around the display area. In the display panel provided by the embodiments of the present disclosure, the non-display area of the color filter substrate is provided with: at least two pressure sensors, a plurality of power supply signal input lines and a plurality of pressure signal output lines. The pressure sensor includes a signal input terminal and a signal output terminal. The plurality of power supply signal input lines are electrically connected to the signal input terminals of the pressure sensors separately. The plurality of pressure signal output lines are electrically connected to the signal output terminals of the pressure sensors separately. The embodiments of the present disclosure solve the technical problem of failing to achieve a narrow bezel of a display panel in the related art since in addition to a display drive circuit, pressure sensors are disposed in the non-display area of the array substrate in the related art. In view of the fact that usually the non-display area of the color filter substrate is not provided with a display driver circuit, in the embodiments of the present disclosure, the pressure sensors, the plurality of power supply signal input lines and the plurality of pressure signal output lines are all disposed in the non-display area of the color filter substrate, not only enriching application functions of the display panel, but also achieving the narrow bezel of the display panel. Moreover, in the case where a plurality of display drive signal lines provided in the non-display area of the array substrate, it is liable to cause interference to pressure sensing signals outputted by the plurality of pressure signal output lines, the technical solution provided by the embodiments of the present disclosure can effectively avoid the interference.

DETAILED DESCRIPTION

The present disclosure will be described in further detail with reference to the accompanying drawings and embodiments. It is to be understood that the embodiments set forth below are intended to explain and not to limit the present disclosure. For ease of description, only a part related to the present disclosure rather than the whole structure is illustrated in the accompanying drawings.

Figure 1A:
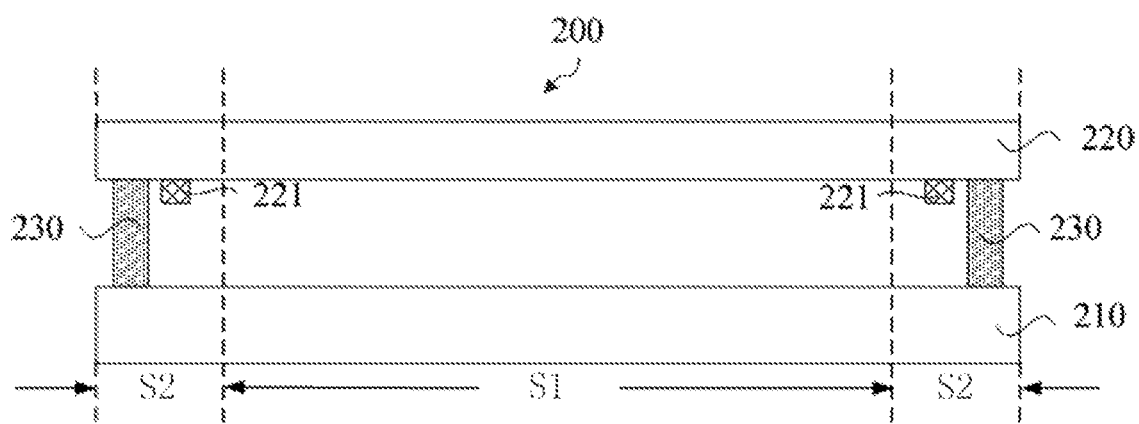
FIG. 1A is a structural diagram of a display panel according to an embodiment of the present disclosure.
Figure 1B:
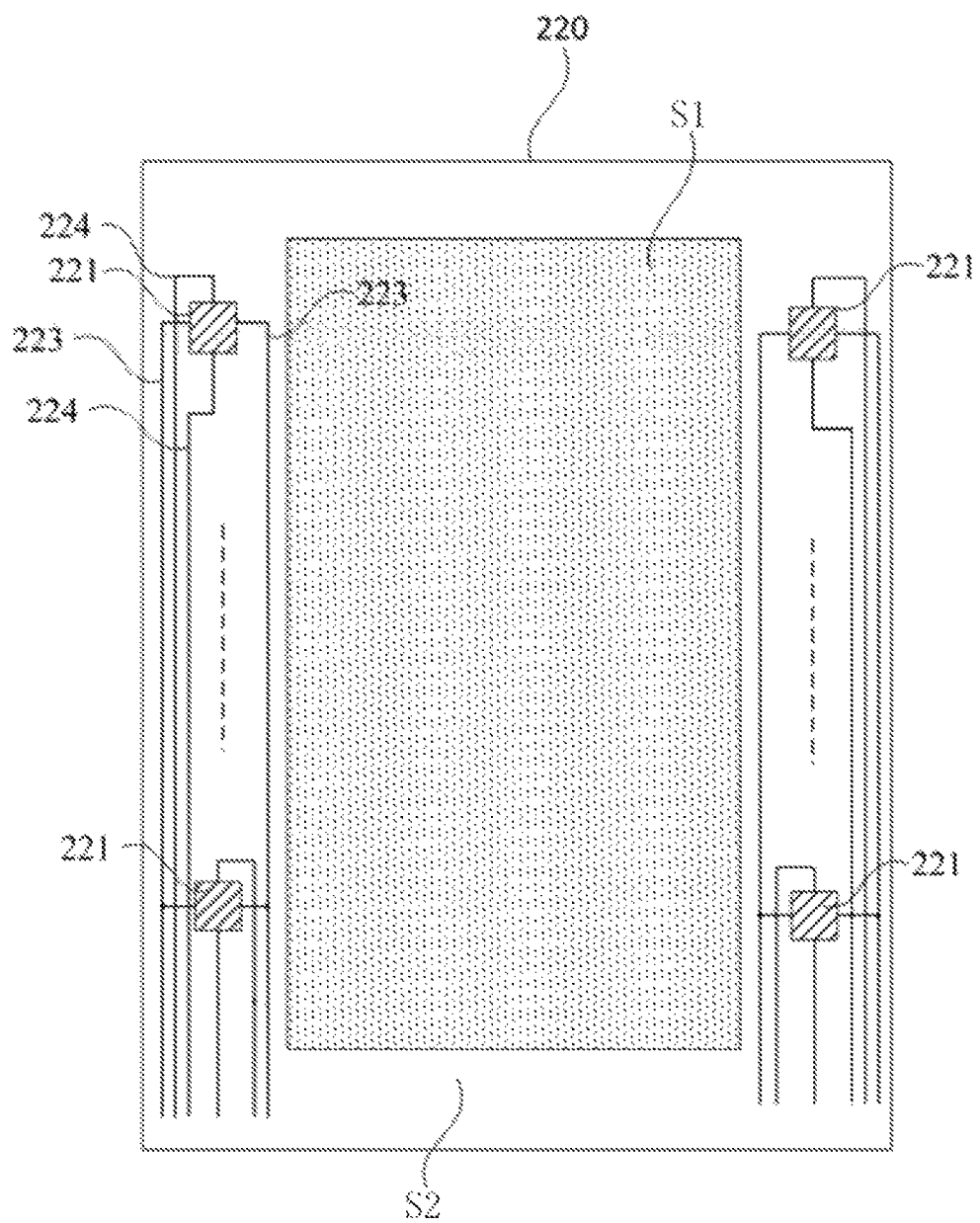
FIG. 1B is a top view of a color filter substrate according to the embodiment as illustrated in FIG. 1A.

FIG. 1A is a structural diagram of a display panel according to an embodiment of the present disclosure. FIG. 1B is a top view of a color filter substrate according to the embodiment as illustrated in FIG. 1A. Referring to FIGS. 1A and 1B, the display panel 200 includes an array substrate 210 and a color filter substrate 220 disposed opposite to each other. The color filter substrate 220 and the array substrate 210 are bonded together by non-conductive sealant 230. Optionally, the sealant 230 is a perimeter sealant. In at least one embodiment, the non-conductive sealant 230 is made of silicone resin or epoxy. The location of the perimeter sealant may be a ring, or a polygon. The display panel 200 includes a display area S1 and a non-display area S2 around the display area S1. The color filter substrate 220 includes a first display area corresponding to the display area S1 and a first non-display area corresponding to the non-display area S2. The array substrate 210 includes a second display area corresponding to the display area S1 and a second non-display area corresponding to the non-display area S2. The first non-display area of the color filter substrate 220 of the display panel 200 is provided with at least two pressure sensors 221, a plurality of power supply signal input lines 223 and a plurality of pressure signal output lines 224. The power supply signal input lines 223 are electrically connected to the signal input terminals of the pressure sensors 221 separately. The pressure signal output lines 224 are electrically connected to the signal output terminals of the pressure sensors 221 separately.

It should be noted that the first non-display area of the color filter substrate 220 in the display panel provided by the embodiment of the present disclosure includes at least two pressure sensors, i.e., two or more pressure sensors, to ensure the corresponding pressure detection function. FIG. 1B only exemplarily illustrates a schematic diagram in which each of the two opposite sides is provided with two pressure sensors 221 separately.

Figure 1C:
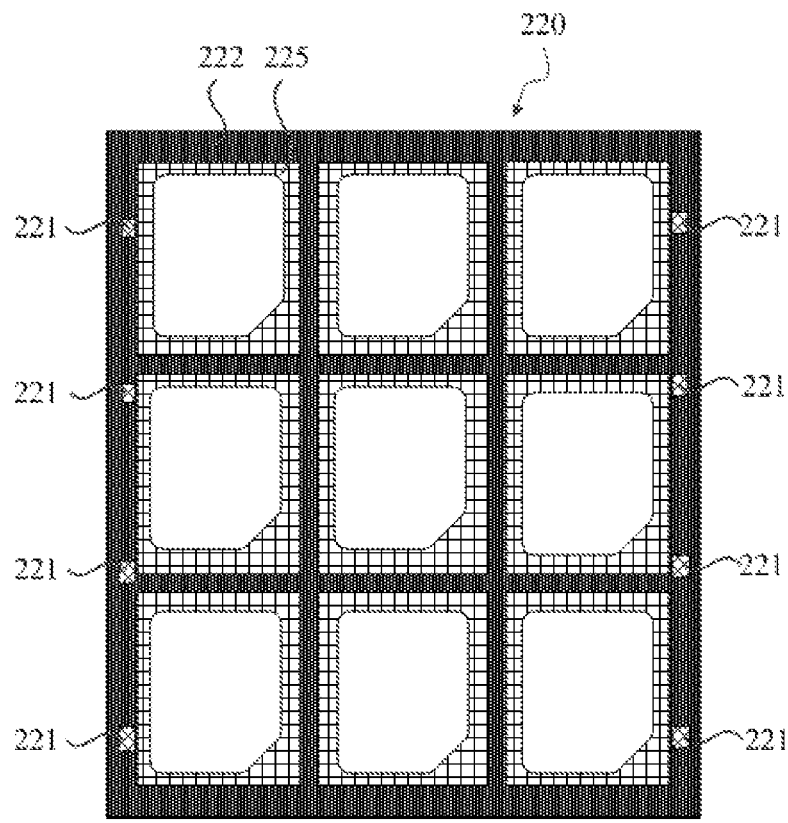
FIG. 1C is a structural diagram of a color filter substrate according to an embodiment of the present disclosure.

In the embodiment of the present disclosure, the display panel 200 may be divided into the display area S1 and the non-display area S2. The second non-display area of the array substrate 210 is typically disposed with a display driver circuit for producing display drive signals to drive pixel units in the display area to emit light. It is not needed to dispose the above display driver circuit on the color filter substrate 220. FIG. 1C is a top view of a color filter substrate according to an embodiment of the present disclosure. Referring to FIG. 1C, the first display area of the color filter substrate 220 includes a plurality of sub-pixels 225, each including a color filter area. The sub-pixels 225 are disposed separate from one another by means of a black matrix 222 and are disposed in open areas of the black matrix 222. The black matrix 222 can avoid light leakage and interference. Pressure sensors 221 are disposed in the first non-display area of the color filter substrate 220. On the one hand, this eliminates the need to dispose the pressure sensors 221 on the array substrate 210 and thus solves the problem of occupying the second non-display area of the array substrate 210 and failing to achieve the narrow bezel of a display panel. The technical solution of the embodiment of the present disclosure not only enriches the application functions of the display panel, but also achieves the narrow bezel of the display panel. On the other hand, usually no display driver circuit is disposed on the color filter substrate 220, and therefore the impact of the display driver circuit on the pressure sensing signals outputted from the signal output terminals of the pressure sensors 221 is effectively avoided.

Furthermore, in the display panel 200 provided by the embodiment of the present disclosure, when the pressure sensors 221 are disposed on the color filter substrate 220, the pressure sensors 221 may be disposed on a side, towards the array substrate 210, of the color filter substrate 220, as illustrated in FIG. 1A, or be disposed on a side, facing away from the array substrate 210, of the color filter substrate 220.

Figure 2:
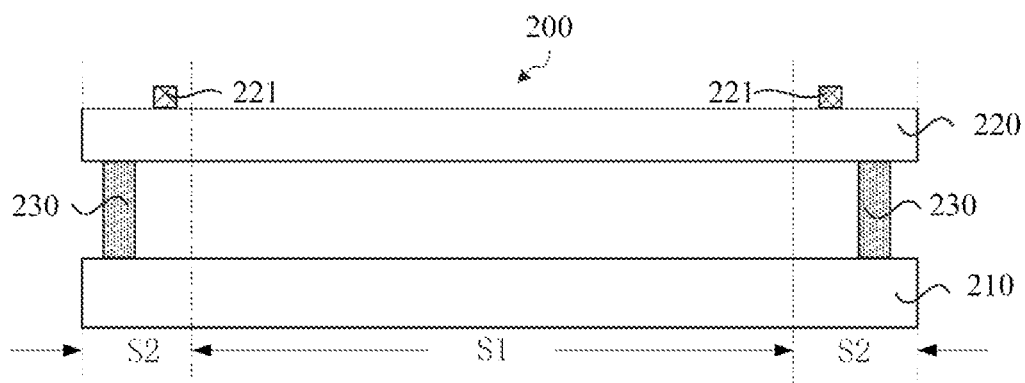
FIG. 2 is a structural diagram of another display panel according to an embodiment of the present disclosure.

FIG. 2 is a structural diagram of another display panel according to an embodiment of the present disclosure. Referring to FIG. 2, the display panel 200 includes a color filter substrate 220 and an array substrate 210 disposed opposite to each other. Structural similarities between the display panel 200 as illustrated in FIG. 2 and the display panel 200 as described in the preceding embodiment will not be described below. Only structural differences will be described below. As illustrated in FIG. 2, pressure sensors 221 on the color filter substrate 220 of the display panel 200 are disposed on a side, facing away from the array substrate 210, of the color filter substrate 220.

The pressure sensors 221 need to be electrically connected to a driver chip via power supply signal input lines and pressure signal output lines, and the driver chip for display is disposed on the array substrate 210. Therefore, in the present embodiment, the pressure sensors 221 are disposed on the side, facing the array substrate 210, of the color filter substrate 220 to facilitate electric connection of the pressure sensors 221 to the driver chip on the array substrate via power supply signal input lines and pressure signal output lines. The embodiments of the present disclosure mainly are described by means of disposing the pressure sensors 221 on the side, towards the array substrate 210, of the color filter substrate 220.

Figure 3A:
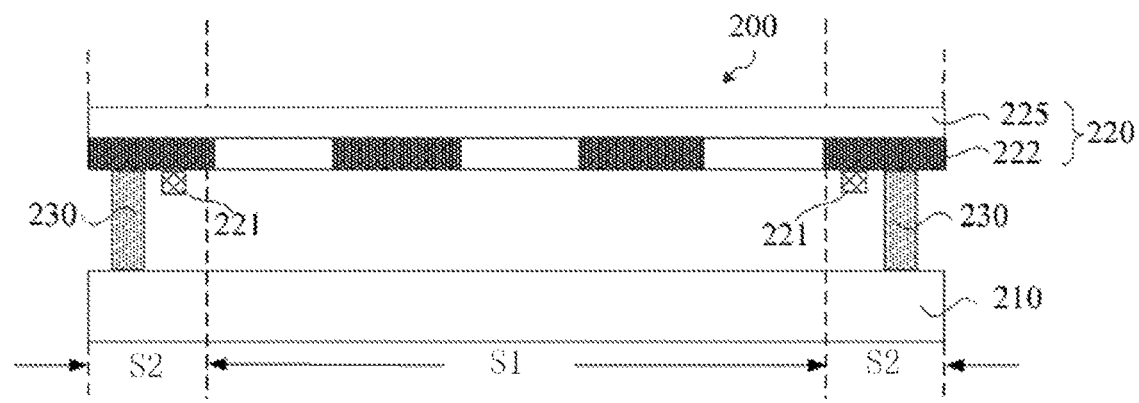
FIG. 3A is a structural diagram of yet another display panel according to an embodiment of the present disclosure.

Optionally, FIG. 3A is a structural diagram of yet another display panel according to an embodiment of the present disclosure. Referring to FIG. 3A, the color filter substrate 220 further includes a base substrate 225 and a black matrix 222. The black matrix 222 is disposed between pressure sensors 221 and the base substrate 225. Optionally, in the present embodiment, the pressure sensors 221 of the color filter substrate 220 are disposed below the black matrix 222 so that the black matrix 222 can block the pressure sensors 221. The base substrate 225 includes a first surface and a second surface. The black matrix 222 is provided on the first surface of the base substrate 225, and then the pressure sensors 221 are formed on the black matrix 222. Then, the base substrate 225 is turned upside down and is bonded to the array substrate 210. The first surface of the base substrate 225 faces the array substrate 210. If the pressure sensors 221 are disposed directly on the base substrate 225, the pressure sensors 221 can be directly viewed from outside since the color filter substrate 220 is located on the light-outgoing surface of the display panel 200 and no black matrix 222 blocks the pressure sensors 221. Especially when pressure sensors 221 made from metal are used, the pressure sensors 221 reflect outside light, thereby seriously affecting the appearance of the display panel.

Figure 3B:
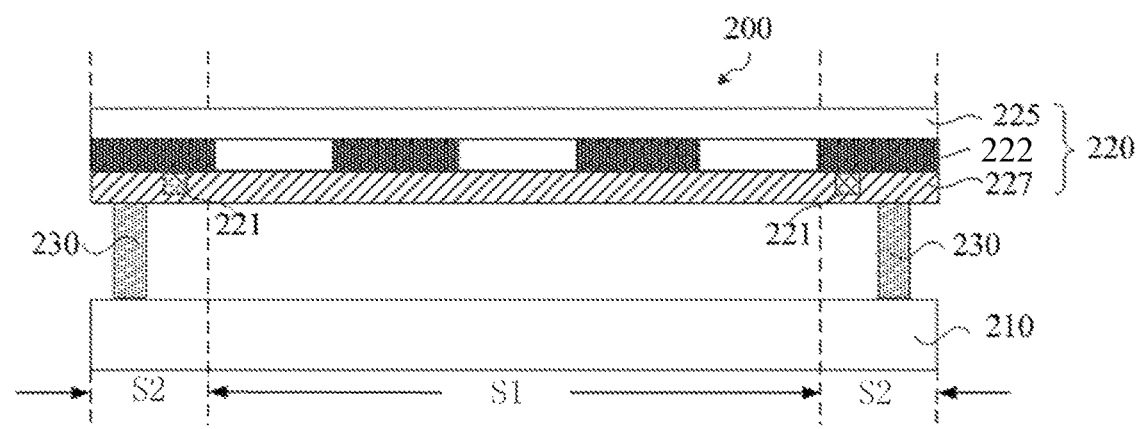
FIG. 3B is a structural diagram of yet another display panel according to an embodiment of the present disclosure.

Optionally, FIG. 3B is a structural diagram of yet another display panel according to an embodiment of the present disclosure. As illustrated in FIG. 3B, in the embodiment of the present disclosure, the color filter substrate 220 further includes a protective layer 227. The protective layer 227 covers the black matrix 222 on the base substrate 225 and the at least two pressure sensors 221 of the color filter substrate 220. The protective layer 227 can effectively protect the pressure sensors 221 from damage.

Optionally, in the embodiment of the present disclosure, the pressure sensors, the power supply signal input lines and pressure signal output lines electrically connected to the pressure sensors may be disposed at the same layer or different layers on the color filter substrate. In the case where the above-mentioned components are disposed at the same layer, the power supply signal input lines and the pressure signal output lines may be routed reasonably spaced apart from other pressure sensors located on the same side of the display area. In the case where the above-mentioned components are disposed at different layers, an insulating layer may be disposed on the color filter substrate, and the pressure sensors, and the power supply signal input lines and the pressure signal output lines may be disposed on top and bottom sides of the insulating layer respectively, thereby reducing the difficulty in routing the signal lines.

Optionally, referring to FIGS. 1A, 3A and 3B, in the embodiments of the present disclosure, the projections of the at least two pressure sensors 221 on the color filter substrate 220 may be configured to not coincide with at least part of the projection of the sealant 230 on the color filter substrate 220. Optionally, the projections of the at least two pressure sensors 221 on the color filter substrate 220 may be configured not to coincide with the projection of the sealant 230 on the color filter substrate 220. Such configurations are made for the following reasons: the color filter substrate 220 and the array substrate 210 are integrally bonded after the sealant 230 is solidified, so when a pressure is applied to the display panel 200, the color filter substrate 220 has a small deformation in the projection area of the sealant 230; and in view of this, the at least two pressure sensors 221 are disposed outside the preceding projection area, that is, the at least two pressure sensors 221 are disposed in an area of the color filter substrate 220 where a large deformation may occur and thereby the pressure detection accuracy can be improved. Moreover, different types of pressure sensors may have different disposing positions with respect to the sealant. For details, see the following embodiments.

Optionally, as described above, in the embodiment of the present disclosure, the pressure sensors disposed on the color filter substrate may be connected to the driver chip on the array substrate, so that power supply signals can be provided by the driver chip on the array substrate via the power supply signal input lines and pressure sensing signals produced by the pressure sensors can be transmitted to the driver chip via the pressure signal output lines. Therefore, it is needed to introduce the power supply signal input lines and the pressure signal output lines on the color filter substrate to the array substrate.

Figure 4A:
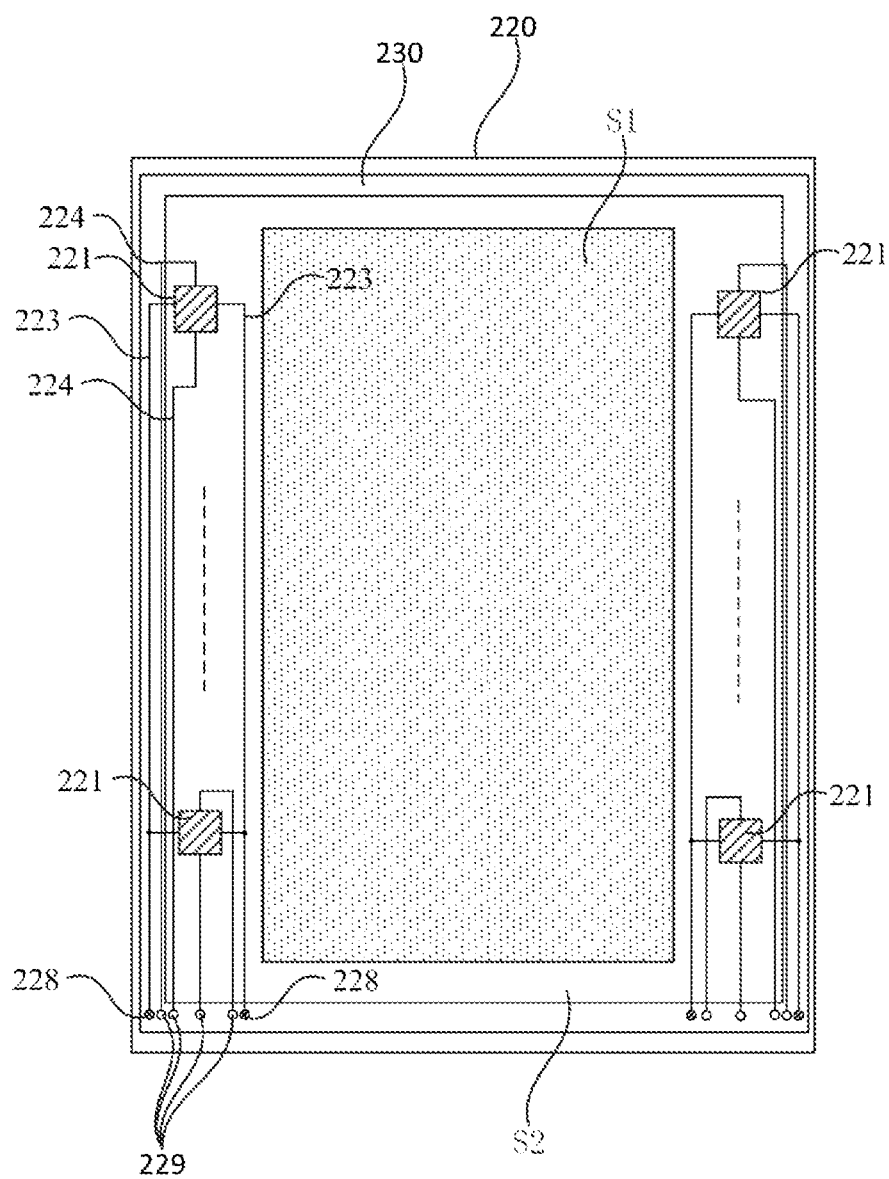
FIG. 4A is a top view of another color filter substrate according to an embodiment of the present disclosure.

Optionally, FIG. 4A is a top view of another color filter substrate according to an embodiment of the present disclosure. As illustrated in FIG. 4A, the non-display area of the color filter substrate 220 is further provided with a plurality of first signal input terminals 228 and a plurality of first signal output terminals 229. Each first signal input terminal 228 corresponds to in one to one correspondence and is electrically connected to a respective one of power supply signal input lines 223, and each first signal output terminal 229 corresponds to in one to one correspondence and is electrically connected to a respective one of pressure signal output lines 224. The first signal input terminals 228 and the first signal output terminals 229 are disposed on the color filter substrate 220 and are located on the same side of the color filter substrate 220 as pressure sensors 221.

Figure 4B:
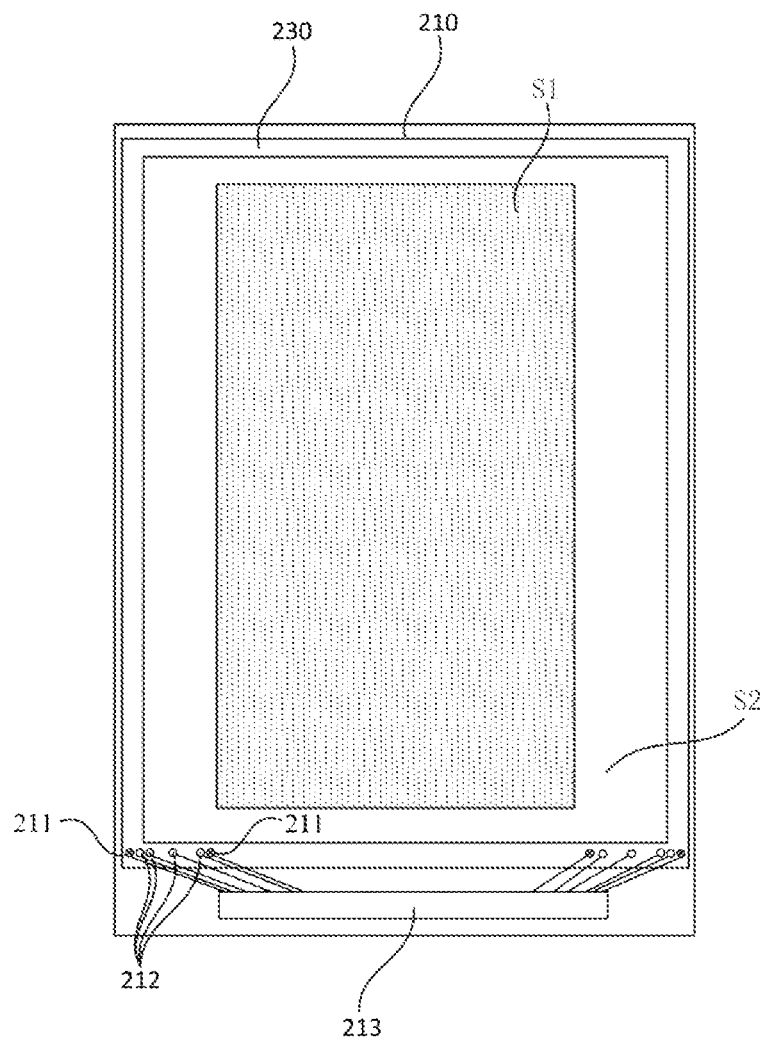
FIG. 4B is a top view of an array substrate according to an embodiment of the present disclosure.

FIG. 4B is a top view of an array substrate according to an embodiment of the present disclosure. As illustrated in FIG. 4B, a plurality of second signal input terminals 211 and a plurality of second signal output terminals 212 are disposed in the non-display area S2 on a side, towards the color filter substrate 220, of the array substrate 210. The plurality of second signal input terminals 211 are in one to one correspondence with and are electrically connected to the first signal input terminals 228 as illustrated in FIG. 4A, and the plurality of second signal output terminal 212 are in one to one correspondence with and are electrically connected to the first signal output terminals 229 as illustrated in FIG. 4A.

Moreover, the second signal input terminals 211 and the second signal output terminals 212 on the array substrate 210 may be electrically connected to a driver chip 213.

Figure 4C:
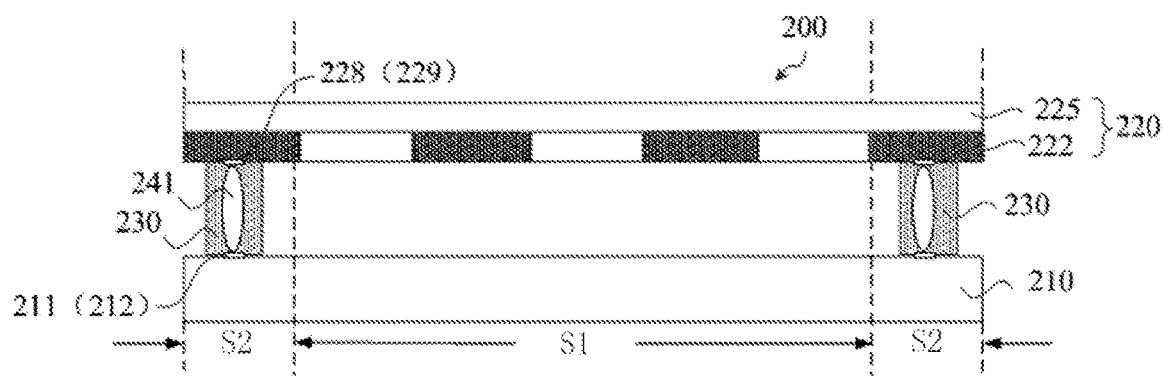
FIG. 4C is a structural diagram of yet another display panel according to an embodiment of the present disclosure.

Optionally, in the embodiment of the present disclosure, the connection mode of the second signal input terminals 211 and the first signal input terminals 228 and the connection mode of the second signal output terminals 212 and the first signal output terminals 229 vary with the positions of the these terminals and the sealant 230. For example, as illustrated in FIGS. 4A and 4B, the first signal input terminals 228, the first signal output terminals 229, the second signal input terminals 211 and the second signal output terminals 212 are all covered by the sealant 230, then, as illustrated in FIG. 4C, discrete conductive gold balls 241 may be disposed in the sealant 230. The second signal input terminals 211 are electrically connected to the corresponding first signal input terminals 228 via the discrete conductive gold balls 241. The second signal output terminals 212 are electrically connected to the corresponding first signal output terminals 229 via the discrete conductive gold balls 241. The terminals on the array substrate are insulated from one another.

In the present embodiment, the first signal input terminals 228, the first signal output terminals 229 of the color filter substrate 220, the second signal input terminals 211 and the second signal output terminals 212 of the array substrate are all covered by the sealant 230, the discrete conductive gold balls 241 are provided in the sealant 230, the discrete conductive gold balls 241 are insulated from each other, each of the second signal input terminals 211 is electrically connected to a respective one of the first signal input terminals 228 via a respective one of the discrete conductive gold balls 241, each of the second signal output terminals 212 is electrically connected to a respective one of the first signal output terminals 229 via a respective one of the discrete conductive gold balls 241, so that the first signal input terminals 228, the first signal output terminals 229, the second signal input terminals 211 and the second signal output terminals 212 do not occupy the bezel area outside the sealant of the display panel. Additionally, the second signal input terminals 211 are electrically connected to the corresponding first signal input terminals 228 via the discrete conductive gold balls 241, and the second signal output terminals 212 are electrically connected to the corresponding first signal output terminals 229 via the discrete conductive gold balls 241. This allows pressure sensors 221 to share the driver chip on the array substrate and thus disposing a driver chip separately on the color filter substrate 220 may be omitted, or disposing a flexible circuit board separately on the color filter substrate 220 may be omitted, thereby simplifying the structure of the display panel 200 and the manufacturing process and reducing the manufacturing costs of the display panel 200.

Figure 5A:
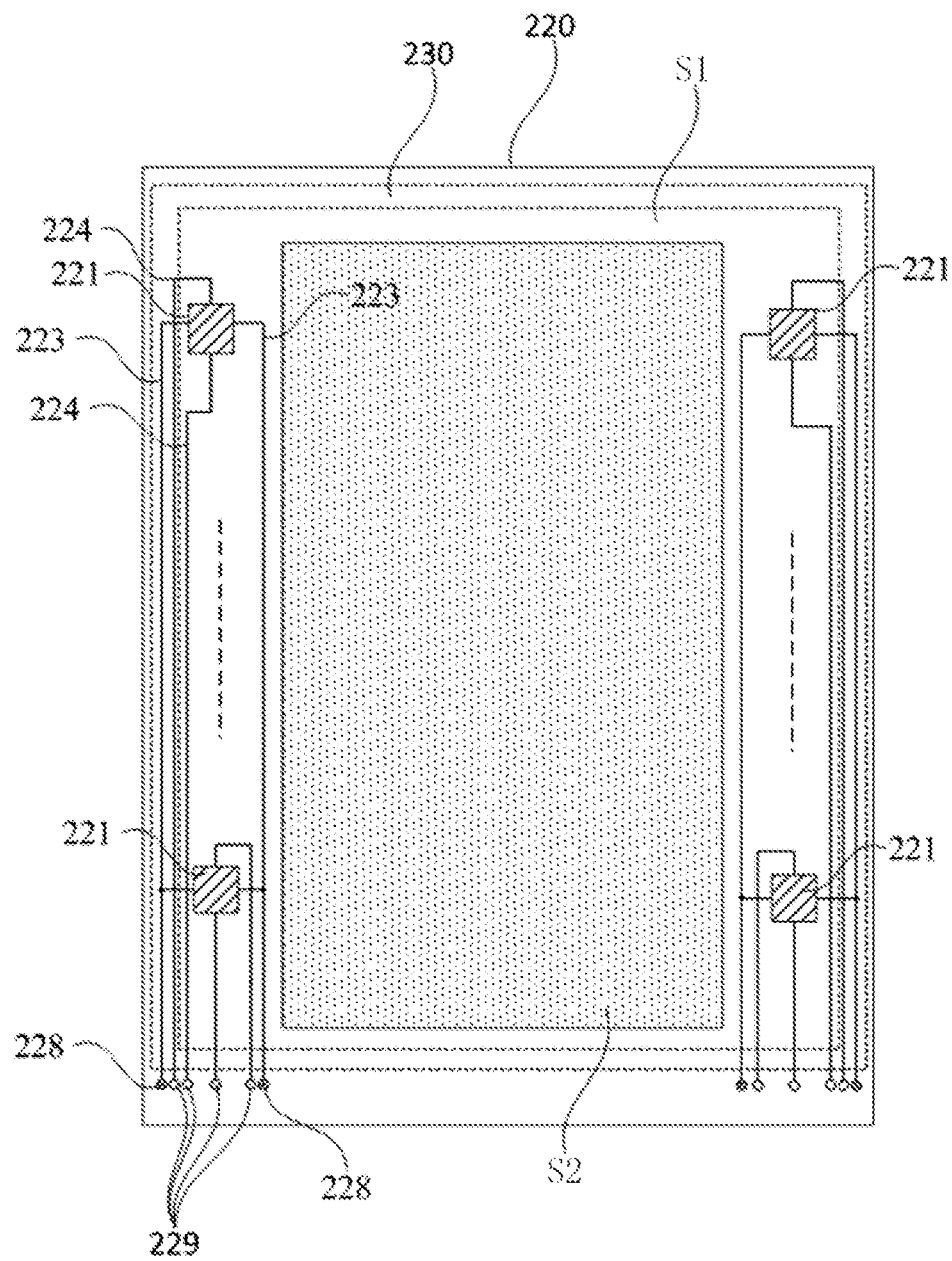
FIG. 5A is a top view of yet another color filter substrate according to an embodiment of the present disclosure.
Figure 5B:
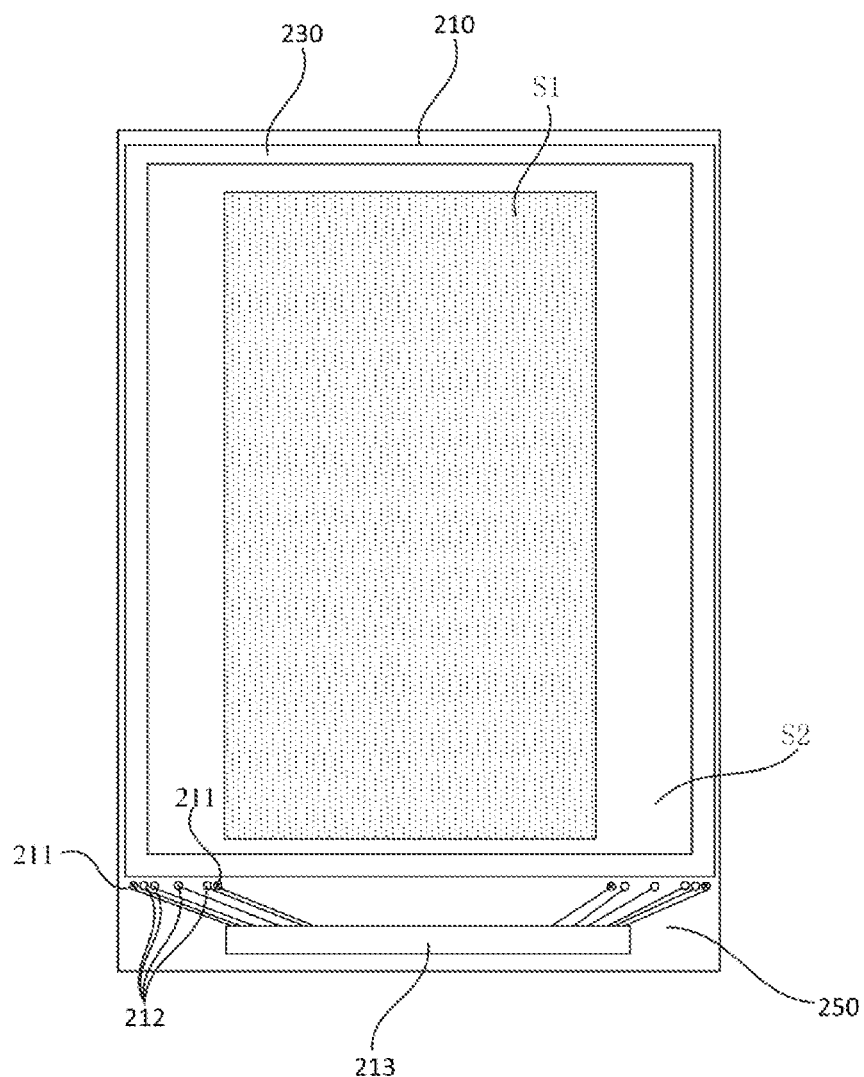
FIG. 5B is a top view of yet another array substrate according to an embodiment of the present disclosure.

Different from the preceding embodiment, in the present embodiment, as illustrated in FIGS. 5A and 5B, the plurality of first signal input terminals 228 and the plurality of first signal output terminals 229 of the color filter substrate 220 are disposed in the non-display area S2 outside the area covered by a sealant 230 on the color filter substrate 220, and the plurality of second signal input terminals 211 and the plurality of second signal output terminals 212 of the array substrate 210 are disposed in the non-display area S2 outside the area covered by the sealant 230 on the array substrate 210.

Figure 5C:
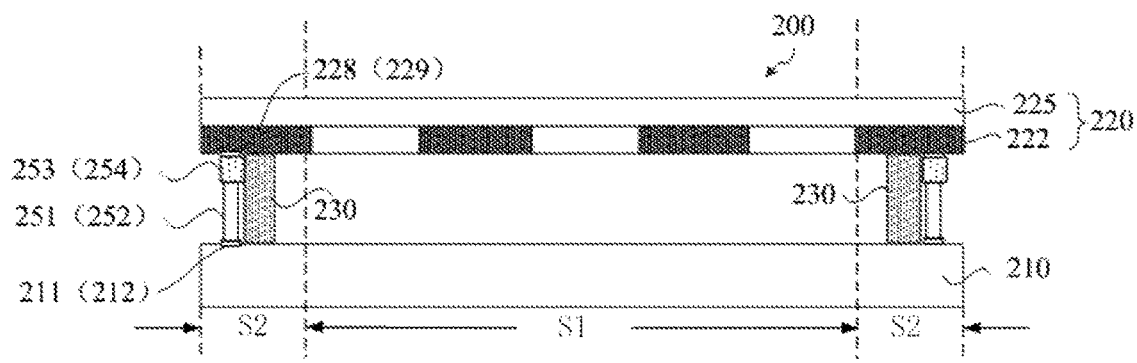
FIG. 5C is a structural diagram of yet another display panel according to an embodiment of the present disclosure.
Figure 5D:
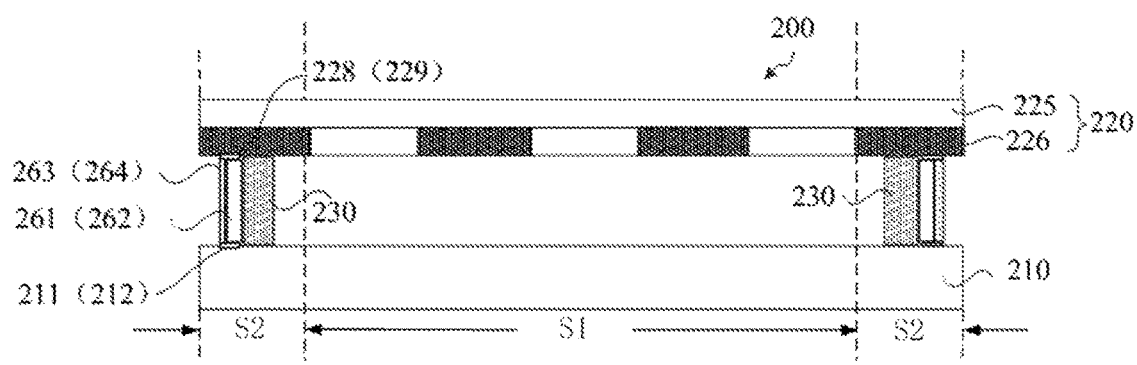
FIG. 5D is a structural diagram of yet another display panel according to an embodiment of the present disclosure.

In this case, in the embodiment of the present disclosure, the connection mode of the plurality of second signal input terminals 211 and the plurality of first signal input terminals 228 and the connection mode of the plurality of second signal output terminals 212 and the plurality of first signal output terminals 229 may be implemented as illustrated in FIG. 5C or as illustrated in FIG. 5D. As illustrated in FIG. 5C, the second signal input terminal 211 is provided with a first conductive pillar 251, the second signal output terminal 212 is provided with a second conductive pillar 252, the first conductive pillar 251 is electrically connected to the first signal input terminal 228 via a first conductive adhesive 253, and the second conductive pillar 252 is electrically connected to the first signal output terminal 229 via a second conductive adhesive 254.

Alternatively, as illustrated in FIG. 5D, the second signal input terminal 211 is formed with a first support pillar 261 and the second signal output terminal 212 is formed with a second support pillar 262. In order for the first support pillar 261 and the second support pillar 262 to be conductive, corresponding conductive adhesives may be adhered to the first support pillar 261 and the second support pillar 262. That is, the second signal input terminal 211 is electrically connected to the first signal input terminals 228 via a third conductive adhesive 263 adhered to the first support pillar 261, and the second signal output terminal 212 is electrically connected to the first signal output terminals 229 via a fourth conductive adhesive 264 adhered to the second support pillar 262.

Optionally, in the embodiment as illustrated in FIGS. 5A and 5B, the second signal input terminals 211 and the second signal output terminals 212 on the array substrate 210 are disposed in a fan-out area 250 outside the area covered by the sealant 230. That is, power supply signal input lines 223 and pressure signal output lines 224 extend along the left and right bezel areas of the color filter substrate 220 so that it is not needed to dispose the power supply signal input lines 223 and the pressure signal output lines 224 along the left and right bezel areas of the array substrate 210, thus facilitating the narrow bezel of the display panel.

Figure 6:
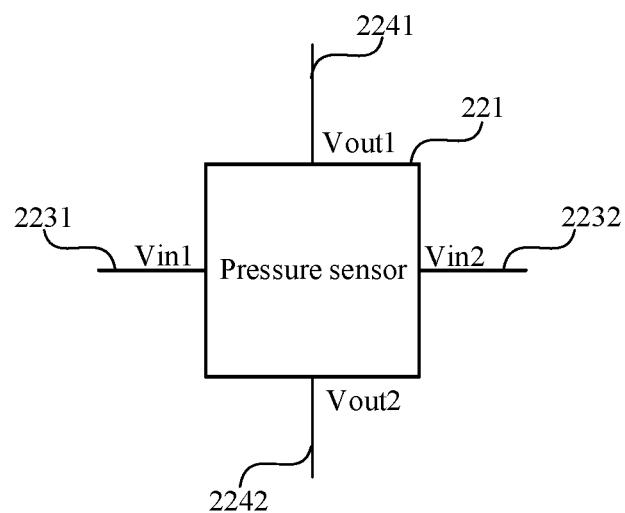
FIG. 6 is a structural diagram of a pressure sensor according to an embodiment of the present disclosure.

FIG. 6 is a structural diagram of a pressure sensor according to an embodiment of the present disclosure. Referring to FIG. 6, a pressure sensor 221 includes a first signal input terminal Vin1, a second signal input terminal Vin2, a first signal output terminal Vout1 and a second signal output terminal Vout2. The first signal input terminal Vin1 is electrically connected to a first power supply signal input line 2231, and the second signal input terminal Vin2 is electrically connected to a second power supply signal input line 2232; and the first signal output terminal Vout1 is electrically connected to a first pressure signal output line 2241, and the second signal output terminal Vout2 is electrically connected to a second pressure signal output line 2242.

Furthermore, as illustrated in FIG. 1B, the color filter substrate 220 may be configured to be a rectangle. The rectangle has two long sides, so the at least two pressure sensors 221 may be disposed in the non-display area S2 on both long sides of the rectangle. On the color filter substrate as illustrated in FIG. 1B, each side of the display area is provided with two pressure sensors 221. Each side of the display area may also be provided with a different number of pressure sensors 221, e.g., three or four pressure sensors 221. Pressure sensors 221 disposed on the same side of the display area may share power supply signal input lines 223. That is, when each pressure sensor 221 is provided with the first power supply signal input line 2231 and the second power supply signal input line 2232 as illustrated in FIG. 6, pressure sensors 221 disposed on the same side of the display area may share the first power supply signal input line 2231 and the second power supply signal input line 2232.

Figure 7:
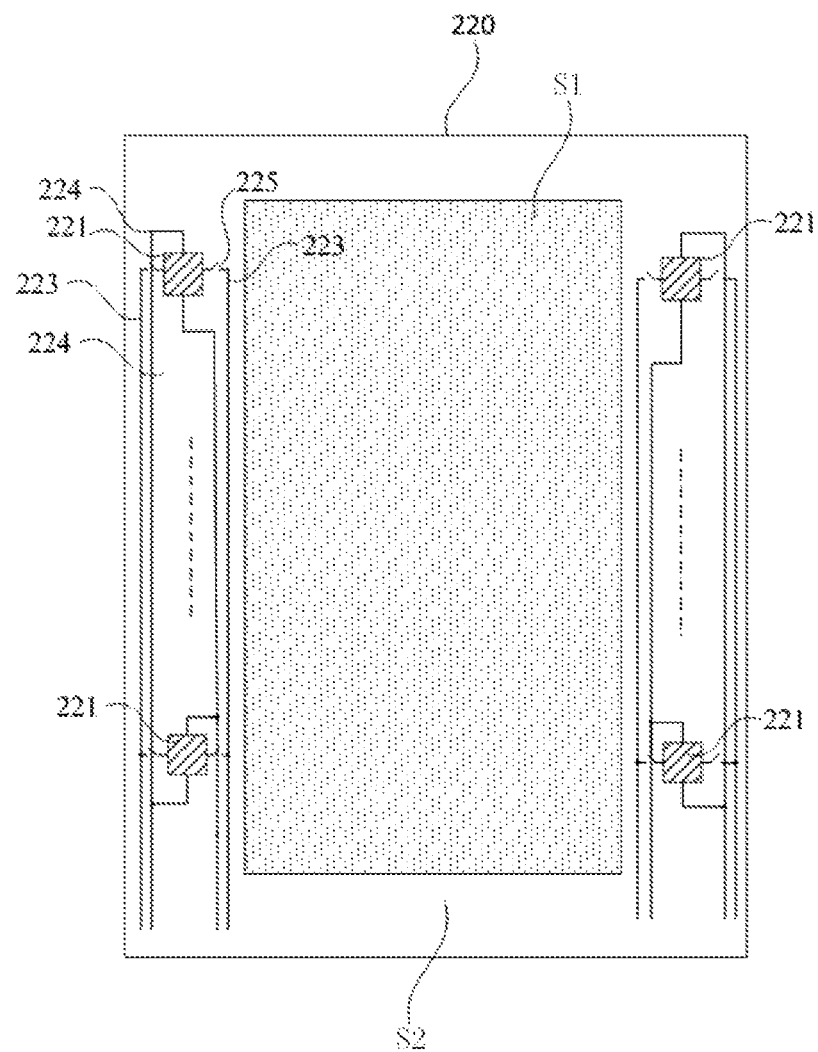
FIG. 7 is a top view of yet another color filter substrate according to an embodiment of the present disclosure.

In the embodiment as illustrated in FIG. 1B, pressure sensors 221 disposed on the same side of the display area share power supply signal input lines 223 and work simultaneously, so each pressure sensor 221 needs a separate pressure signal output line 224. Optionally, if the pressure sensors 221 disposed on the same side of the display area can be controlled to work in time-division mode, then the pressure sensors 221 disposed on the same side of the display area can share pressure signal output lines 224. That is, when the pressure sensor as illustrated in FIG. 6 is provided with the first pressure signal output line 2241 and the second pressure signal output line 2242, two pressure signal output lines 224 are adequate for multiple pressure sensors 221 on the same side of the display area. Optionally, as illustrated in FIG. 7, the power supply signal input line 223 of each pressure sensor 221 is provided with a switch 225 for controlling each pressure sensor 221 to work in time-division mode.

Optionally, each pressure sensor 221 provided by the preceding embodiment may be a bridge pressure sensor or a semiconductor pressure sensor.

Figure 8A:
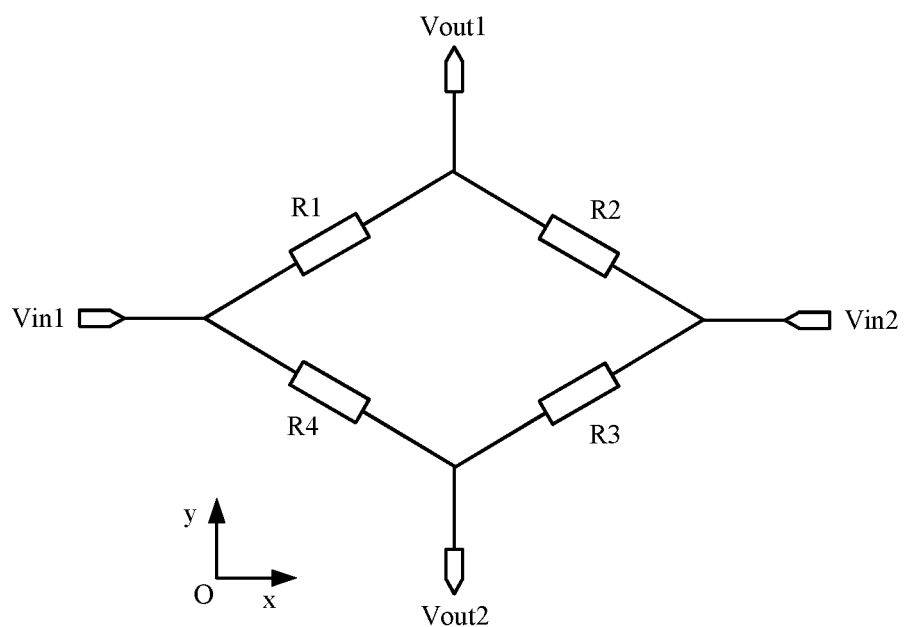
FIG. 8A is an equivalent circuit diagram of a bridge pressure sensor according to an embodiment of the present disclosure.

FIG. 8A is an equivalent circuit diagram of a bridge pressure sensor according to an embodiment of the present disclosure. As illustrated in FIG. 8A, the pressure sensor 221 may be a Wheatstone bridge pressure sensor. Accordingly, the pressure sensor 221 includes a first sense resistor R1, a second sense resistor R2, a third sense resistor R3 and a fourth sense resistor R4. The first terminal of the first sense resistor R1 is electrically connected to the first signal input terminal Vin1 and the second terminal of the first sense resistor R1 is electrically connected to the first signal output terminal Vout1. The first terminal of the second sense resistor R2 is electrically connected to the second signal input terminal Vin2 and the second terminal of the second sense resistor R2 is electrically connected to the first signal output terminal Vout1. The first terminal of the third sense resistor R3 is electrically connected to the second signal input terminal Vin2 and the second terminal of the third sense resistor R3 is electrically connected to the second signal output terminal Vout2. The first terminal of the fourth sense resistor R4 is electrically connected to the first signal input terminal Vin1 and the second terminal of the fourth sense resistor R4 is electrically connected to the second signal output terminal Vout2.

The first sense resistor R1, the second sense resistor R2, the third sense resistor R3 and the fourth sense resistor R4 of the bridge pressure sensor may be made from a metal material or a semiconductor material. The semiconductor material may be a polysilicon film or an amorphous silicon film.

Figure 8B:
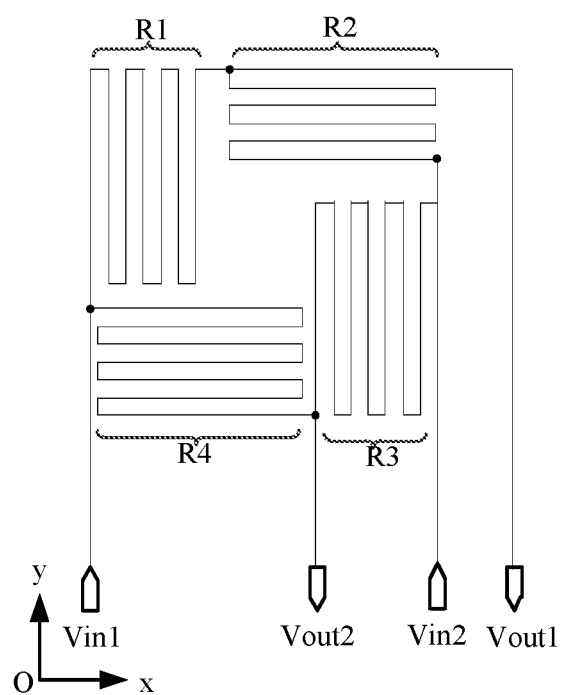
FIG. 8B is a wiring diagram of a bridge pressure sensor according to an embodiment of the present disclosure.

Additionally, each sense resistor of the bridge pressure sensor has a different extension direction and has different deformations in different extension directions and the variations of resistance are different. As illustrated in FIG. 8B, two directions, which are perpendicular to each other, of the color filter substrate 220 are defined as a first extension direction x and a second extension direction y. The component of the extension length from the first terminal to the second terminal of the first sense resistor R1 in the first extension direction x is greater than that in the second extension direction y. The component of the extension length from the first terminal to the second terminal of the second sense resistor R2 in the second extension direction y is greater than that in the first extension direction x. The component of the extension length from the first terminal to the second terminal of the third sense resistor R3 in the first extension direction x is greater than that in the second extension direction y. The component of the extension length from the first terminal to the second terminal of the fourth sense resistor R4 in the second extension direction y is greater than that in the first extension direction x. Such configurations allow the display panel 200 to sense a deformation in the first extension direction x via the first sense resistor R1 and the third sense resistor R3 and to sense a deformation in the second extension direction y via the second sense resistor R2 and the fourth sense resistor R4.

Usually when achieving a balance, the bridge satisfies the formula R1\R4=R2\R3. Through the preceding configurations, when a deformation occurs in the direction x, R1 and R3 have large resistance changes, and the preceding formula fails to meet the balance requirement if the resistance of R1 and the resistance of R3 increase or decrease simultaneously. Through the preceding configurations, when a deformation occurs in the direction y, R2 and R4 have large resistance changes, and the preceding formula fails to meet the balance requirement if the resistance of R2 and the resistance of R4 increase or decrease simultaneously. The preceding configurations ensure the sensitivity of the pressure sensor.

Optionally, the first sense resistor R1, the second sense resistor R2, the third sense resistor R3 and the fourth sense resistor R4 of the bridge pressure sensor may be polyline-shaped. FIG. 8B is a schematic diagram showing the wire configuration of a bridge pressure sensor according to an embodiment of the present disclosure. Referring to FIG. 8B, a first sense resistor R1, a second sense resistor R2, a third sense resistor R3 and a fourth sense resistor R4 which are all polyline-shaped are connected to one another end to end and are electrically connected to a first signal input terminal Vin1, a first signal output terminal Vout1, a second signal input terminal Vin2 and a second signal output terminal Vout2 of the pressure sensor accordingly. When configured to be polyline-shaped, different sense resistors are easily arranged to extend in different directions. The end-to-end connections between the polyline-shaped sense resistors ensure a short distance between the sense resistors, thus eliminating the impact of the temperature difference between the sense resistors.

Figure 8C:
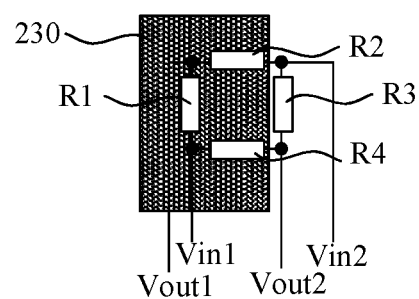
FIG. 8C is a wire configuration diagram of another bridge pressure sensor according to an embodiment of the present disclosure.
Figure 8D:
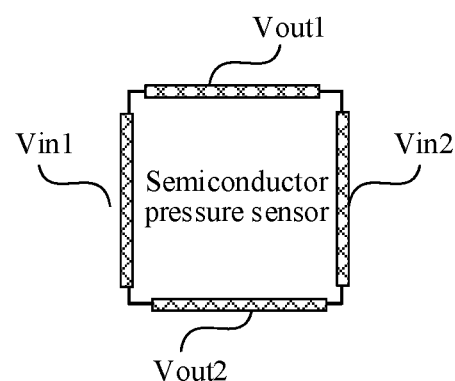
FIG. 8D is a structural diagram of a semiconductor pressure sensor according to an embodiment of the present disclosure.

As regards the positional relationship between the bridge pressure sensor and the projection of the sealant on the color filter substrate, among the four sense resistors of the bridge pressure sensor, one, two or three may be disposed in the projection of the sealant on the color filter substrate. According to FIG. 8A and the formula R1\R4=R2\R3 which is satisfied when the bridge achieves a balance. When one or more sense resistors are disposed in the projection of the sealant on the color filter substrate, the deformation of the color filter substrate in the projection of the sealant is small due to fixation by the sealant after pressure is applied to the color filter substrate, and accordingly the resistance change of the sense resistors disposed in the projection are small. Optionally, as illustrated in FIG. 8C, three sense resistors R2, R3 and R4 are all disposed in the projection of the sealant on the color filter substrate, so the deformations, if occur, of the three sense resistors are small and the deformation of the sense resistor R1 is large. In this case, the preceding formula is not satisfied and the pressure sensor outputs pressure sensing signals. Optionally, in the case where one or two sense resistors of the pressure sensor are disposed in the projection of the sealant on the color filter substrate, when pressure is applied to the pressure sensor, the preceding formula is not satisfied and the pressure sensor outputs pressure sensing signals. FIG. 8D is a structural diagram of a semiconductor pressure sensor according to an embodiment of the present disclosure. As illustrated in FIG. 8D, the semiconductor pressure sensor is a quadrangle. A first signal input terminal Vin1 and a second signal input terminal Vin2 are disposed on two opposite sides of the quadrangle. A first signal output terminal Vout1 and a second signal output terminal Vout2 are disposed on another two opposite sides of the quadrangle. The semiconductor pressure sensor may be made from a polysilicon film or an amorphous silicon film. The semiconductor pressure sensor has the advantages of having a small area and sensing pressure sensitively.

Figure 8E:
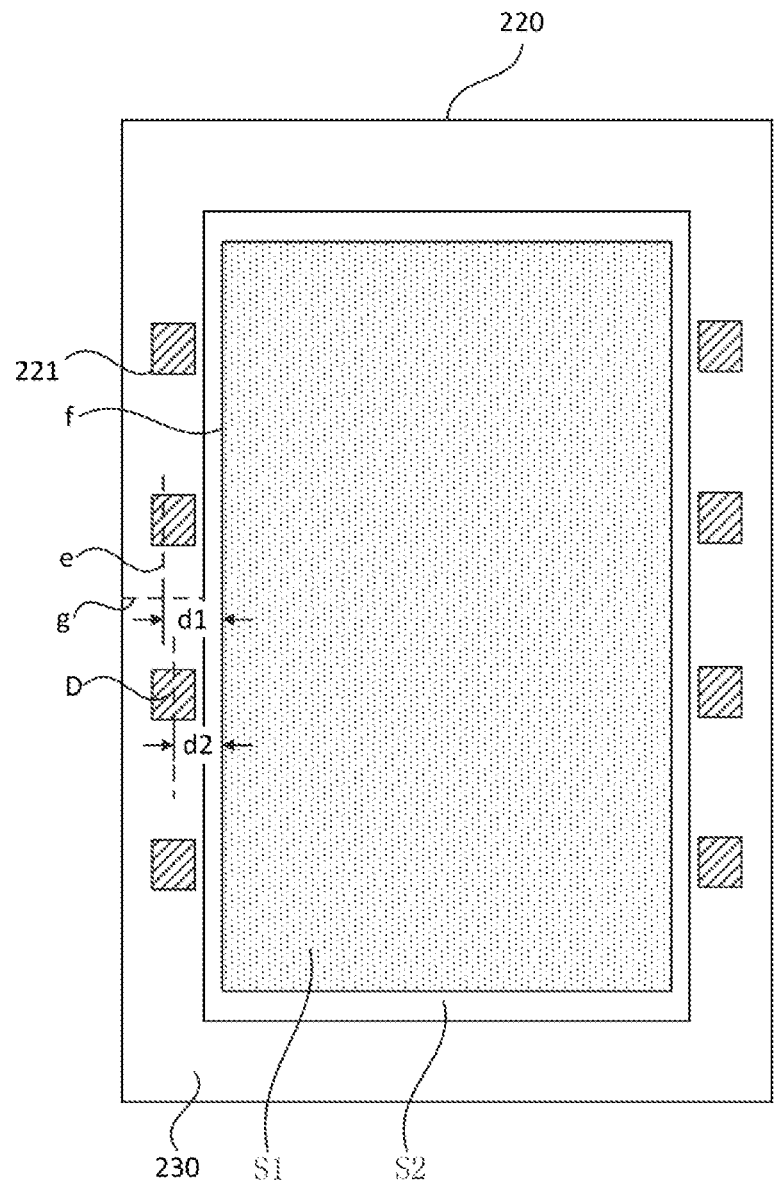
FIG. 8E is a top view of yet another color filter substrate according to an embodiment of the present disclosure.

Optionally, referring to FIG. 8E, as regards the positional relationship between the semiconductor pressure sensor and the sealant, a distance d1 from an centerline e of the sealant 230 to the boundary f between the display area S1 and the non-display area S2 is greater than a distance d2 from a geometric centerline D of the pressure sensor 221 to the boundary f between the display area S1 and the non-display area S2. The sealant 230 forms a rectangular frame and typically the pressure sensors are disposed near the long opposing sides but not the short opposing sides. There is a half-line g crossing the sealant 230's two long opposing sides at the half way and perpendicular to the centerline e within the long sides of the rectangular frame. Such configurations are made for the following reasons: the array substrate 210 and the color filter substrate 220 are adhered to each other via the sealant 230, so in the projection area of the sealant 230, the binding force between the array substrate 210 and the color filter substrate 220 is stronger at a position closer to the centerline e of the sealant 230 and is weaker at a position closer to the outer edge of the sealant 230. Thus, when pressure is applied, a smaller deformation occurs on the color filter substrate 220 if the pressure sensor 221 is disposed at a position closer to the centerline e of the sealant 230 and a larger deformation occurs on the color filter substrate 220 if the pressure sensor 221 is disposed at a position closer to the edge of the sealant 230. Therefore, such configurations not only allow the pressure sensor and the sealant overlap to achieve a narrow bezel configuration but also avoid sensing failures caused by a touch position get too close to the centerline of the sealant to cause deformation.

Figure 8F:
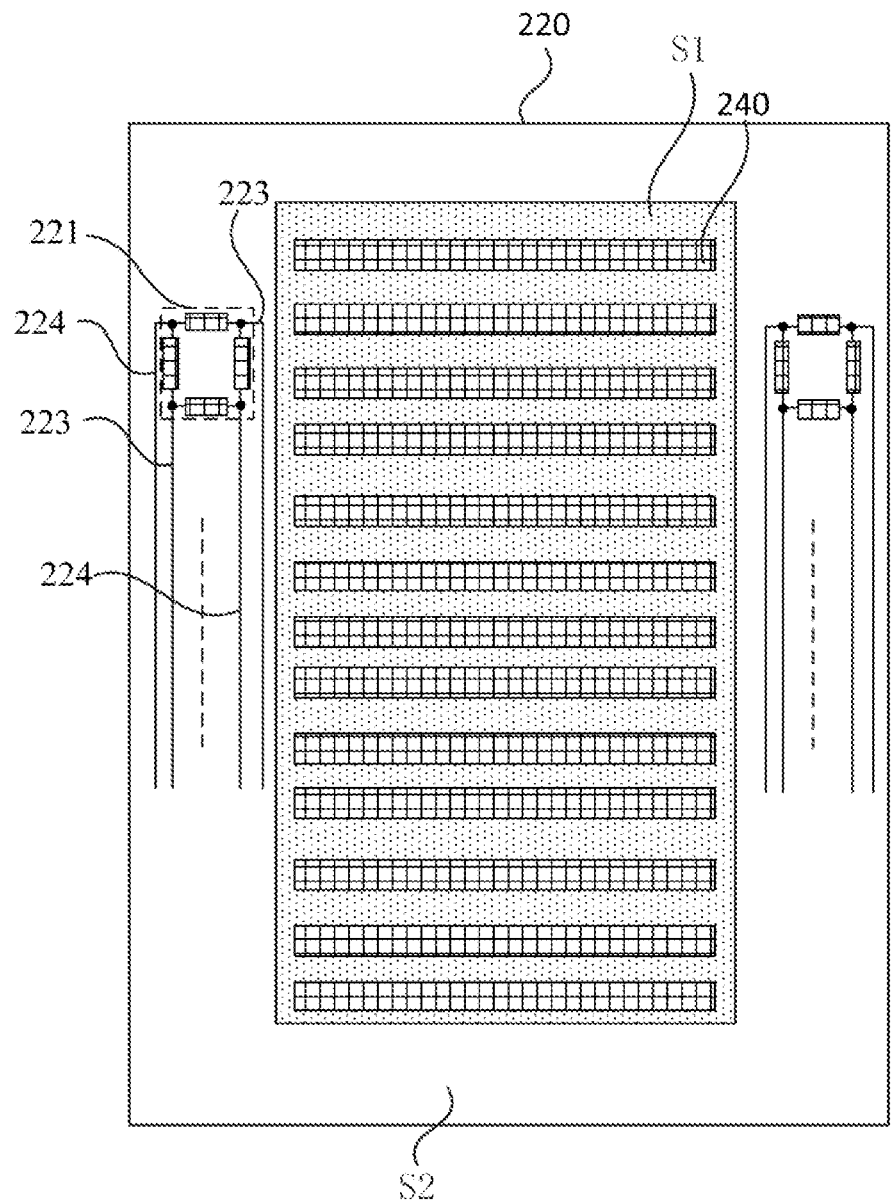
FIG. 8F is a top view of yet another color filter substrate according to an embodiment of the present disclosure.

Furthermore, in the present embodiment of the disclosure, when the pressure sensors are manufactured on the color filter substrate, touch electrodes for detecting a touch position may be manufactured simultaneously on the color filter substrate. The touch electrodes may be disposed in the display area, disposed at the same layer as the pressure sensors and made from the same material as the pressure sensors. As illustrated in FIG. 8F, on the color filter substrate 220, in addition to pressure sensors 221, power supply signal input lines 223 and pressure signal output lines 224 disposed in the non-display area S2, touch electrodes 240 are disposed in the display area S1. The pressure sensor 221 is a bridge pressure sensor and includes four sense resistors. The touch electrode 240 may be used as a touch driving electrode for mutual-capacitive touch detection or a touch sensing electrode. Another electrode corresponding to the touch electrode 240 may be disposed on the array substrate. The touch electrodes 240 may extend in a short side direction or a long side direction of the rectangular color filter substrate 220.

The above touch electrode 240 and the four sense resistors of the pressure sensor 221 may be disposed at the same layer and may be manufactured using the same material in the same technical process. Optionally, in order to not affect the display effect, the touch electrode 240 on the display area may be made into a metal mesh that is stacked up with the black matrix to avoid the open areas of sub-pixels in the display area. Optionally, either of the following two technical processes may be adopted. In one technical process, a printing technology is used. The printing technology does not involve masks and thus can save manufacturing costs. In this case, as illustrated in FIG. 8F, the four sense resistors of the pressure sensor are also metal meshes. In the other technical process, patterned metal layers are used in the manufacturing. For example, exposure, development, etching and other techniques are used with masks to form the metal mesh-shaped touch electrode 240. In this case, the four sense resistors of the pressure sensor 221 may be made into metal meshes as illustrated in FIG. 8F or block-shaped, polyline-shaped or other-shaped sense resistors. Patterning techniques have the advantage of high position accuracy, thus ensuring that metal materials avoid the pixel open areas in the display area.

Figure 9:
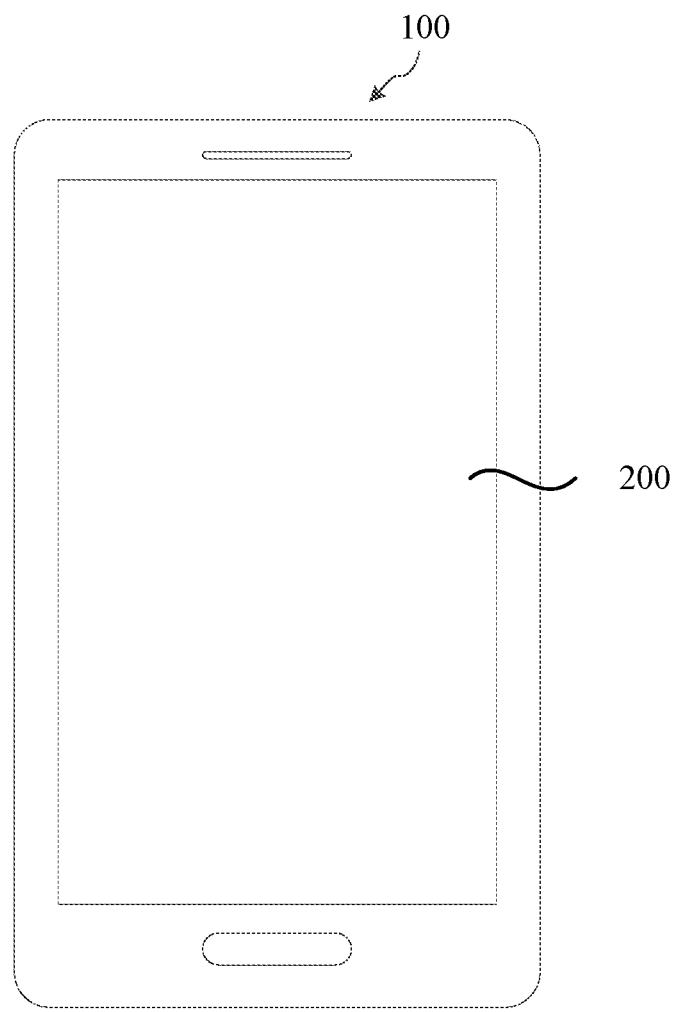
FIG. 9 is a structural diagram of a display device according to an embodiment of the present disclosure.

FIG. 9 is a structural diagram of a display device according to an embodiment of the present disclosure. Referring to FIG. 9, the display device 100 includes the display panel 200 of any one of the preceding embodiments of the present disclosure. The display device 100 may be a mobile phone, a computer, a smart watch, or an information inquiry machine in a public service hall, etc.

The display device provided by the present embodiment of the disclosure includes the display panel of any one of the preceding embodiments of the present disclosure. The display panel includes at least two pressure sensors, a plurality of power supply signal input lines and a plurality of pressure signal output lines that are disposed in the non-display area of a color filter substrate, not only enriching application functions of the display panel, but also achieving the narrow bezel of the display panel.

It is to be noted that the above are only preferred embodiments of the present disclosure and the technical principles used therein. It will be understood by those skilled in the art that the present disclosure is not limited to the specific embodiments described herein. Those skilled in the art can make various apparent changes, modifications and substitutions without departing from the scope of the present disclosure. Therefore, while the present disclosure has been described in detail via the above-mentioned embodiments, the present disclosure is not limited to the above-mentioned embodiments and may include more other equivalent embodiments without departing from the concept of the present disclosure. The scope of the present disclosure is determined by the scope of the appended claims.

What is claimed is:

1. A display panel, comprising:
   a color filter substrate and an array substrate disposed opposite to each other and bonded together by non-conductive sealant;
   wherein the display panel comprises a display area and a non-display area around the display area,
   wherein the color filter substrate comprises a first display area corresponding to the display area of the display panel and a first non-display area corresponding to the non-display area of the display panel,
   wherein the first non-display area of the color filter substrate comprises:
   at least two pressure sensors disposed either on a side facing or a side facing away from the array substrate, wherein each of the at least two pressure sensors comprises a signal input terminal and a signal output terminal;
   a plurality of power supply signal input lines, wherein each of the plurality of power supply signal input lines is electrically connected to a respective one of the signal input terminals of the at least two pressure sensors;
   a plurality of pressure signal output lines, wherein each of the plurality of pressure signal output lines is electrically connected to a respective one of the signal output terminals of the at least two pressure sensors;
   a plurality of first signal input terminals electrically connected to the plurality of power supply signal input lines in one-to-one correspondence; and
   a plurality of first signal output terminals each electrically connected to one of the plurality of pressure signal output lines in an one-to-one correspondence;
   wherein the plurality of first signal input terminals and the plurality of first signal output terminals are disposed on a same side of the color filter substrate as the at least two pressure sensors; and
   wherein the array substrate comprises a second display area corresponding to the display area of the display panel and a second non-display area corresponding to the non-display area of the display panel, wherein the second non-display area of the array substrate facing the first non-display area of the color filter substrate comprises:
  a plurality of second signal input terminals electrically connected to the plurality of first signal input terminals in an one-to-one correspondence; and
  a plurality of second signal output terminals electrically connected to the plurality of first signal output terminals in an one-to-one correspondence.

2. The display panel of claim 1, wherein when the at least two pressure sensors are disposed on the side of the color filter substrate facing the array substrate, the color filter substrate further comprises:
  a base substrate; and
  a black matrix on the base substrate, wherein the black matrix is disposed between the at least two pressure sensors and the base substrate.

3. The display panel of claim 2, wherein the color filter substrate further comprises:
  a protective layer, which covers the at least two pressure sensors and the black matrix on the base substrate.

4. The display panel of claim 1, wherein the plurality of first signal input terminals, the plurality of first signal output terminals, the plurality of second signal input terminals and the plurality of second signal output terminals are all covered by the non-conductive sealant, wherein discrete conductive gold balls are provided in the non-conductive sealant, wherein each of the plurality of second signal input terminals is electrically connected to a respective one of the plurality of first signal input terminals via a respective one of the discrete conductive gold balls and each of the plurality of second signal output terminals is electrically connected to a respective one of the plurality of first signal output terminals via a respective one of the discrete conductive gold balls.

5. The display panel of claim 1, wherein the plurality of first signal input terminals and the plurality of first signal output terminals are disposed in the first non-display area of the color filter substrate and are not covered by the non-conductive sealant, and the plurality of second signal input terminals and the plurality of second signal output terminals are disposed in the second non-display area of the array substrate facing the first non-display area of the color filter substrate and are not covered by the non-conductive sealant; and
  wherein each of the plurality of second signal input terminals is provided with a first conductive pillar, the first conductive pillar is electrically connected to a respective one of the plurality of first signal input terminals via a first conductive adhesive, each of the plurality of second signal output terminals is provided with a second conductive pillar, and the second conductive pillar is electrically connected to a respective one of the plurality of first signal output terminals via a second conductive adhesive.

6. The display panel of claim 1, wherein the plurality of first signal input terminals and the plurality of first signal output terminals are disposed in the first non-display area of the color filter substrate and are not covered by the non-conductive sealant, and the plurality of second signal input terminals and the plurality of second signal output terminals are disposed in the second non-display area of the array substrate and are not covered by the non-conductive sealant; and
  wherein each of the plurality of second signal input terminals is provided with a first support pillar, the first support pillar is electrically connected to a respective one of the plurality of first signal input terminals via a third conductive adhesive adhered to the first support pillar, each of the plurality of second signal output terminals is provided with a second support pillar, the second support pillar is electrically connected to a respective one of the plurality of first signal output terminals via a fourth conductive adhesive adhered to the second support pillar.

7. The display panel according to claim 5, wherein the plurality of second signal input terminals and the plurality of second signal output terminals are disposed in a fan-out area of the array substrate and not covered by the non-conductive sealant.

8. The display panel of claim 1, wherein neither of projections of the at least two pressure sensors on the color filter substrate do not overlaps with a projection of the non-conductive sealant on the color filter substrate.

9. The display panel of claim 1, wherein each of the at least two pressure sensors comprises a first signal input terminal and a second signal input terminal, wherein the first signal input terminal is electrically connected to a first power supply signal input line, and wherein the second signal input terminal is electrically connected to a second power supply signal input line; and
  wherein each of the at least two pressure sensors comprises a first signal output terminal and a second signal output terminal, the first signal output terminal is electrically connected to a first pressure signal output line, and the second signal output terminal is electrically connected to a second pressure signal output line.

10. The display panel of claim 9, wherein each of the at least two pressure sensors comprises a first sense resistor, a second sense resistor, a third sense resistor and a fourth sense resistor,
  wherein a first terminal of the first sense resistor is electrically connected to the first signal input terminal and a second terminal of the first sense resistor is electrically connected to the first signal output terminal;
  wherein a first terminal of the second sense resistor is electrically connected to the second signal input terminal and a second terminal of the second sense resistor is electrically connected to the first signal output terminal;
  wherein a first terminal of the third sense resistor is electrically connected to the second signal input terminal and a second terminal of the third sense resistor is electrically connected to the second signal output terminal; and
  wherein a first terminal of the fourth sense resistor is electrically connected to the first signal input terminal and a second terminal of the fourth sense resistor is electrically connected to the second signal output terminal.

11. The display panel of claim 10, wherein the color filter substrate comprises a first extension direction and a second extension direction perpendicular to each other, a component of an extension length of the first sense resistor from the first terminal to the second terminal of the first sense resistor in the first extension direction is greater than that in the second extension direction, a component of an extension length of the second sense resistor from the first terminal to the second terminal of the second sense resistor in the second extension direction is greater than that in the first extension direction, a component of an extension length of the third sense resistor from the first terminal to the second terminal of the third sense resistor in the first extension direction is greater than that in the second extension direction, and a component of an extension length of the fourth sense resistor from the first terminal to the second terminal of the fourth sense resistor in the second extension direction is greater than that in the first extension direction.

12. The display panel of claim 11, wherein the first sense resistor, the second sense resistor, the third sense resistor and the fourth sense resistor are all polyline-shaped.

13. The display panel of claim 10, wherein the first sense resistor, the second sense resistor, the third sense resistor and the fourth sense resistor are made of a metal material or made of a polysilicon film or an amorphous silicon film.

14. The display panel of claim 9, wherein each of the at least two pressure sensors is a semiconductor pressure sensor, wherein the semiconductor pressure sensor is a quadrangle, the first signal input terminal and the second signal input terminal are disposed on two opposite sides of the quadrangle, and the first signal output terminal and the second signal output terminal are disposed on two opposite sides of the quadrangle.

15. The display panel of claim 14, wherein the at least two pressure sensors are made from a polysilicon film or an amorphous silicon film.

16. The display panel of claim 9, wherein the color filter substrate is a rectangle, and wherein the at least two pressure sensors are disposed in the first non-display area of the color filter substrate close to two long sides of the rectangle.

17. The display panel of claim 16, wherein the first pressure signal output line and the second pressure signal output line are shared by pressure sensors disposed on a same side of the first display area of the color filter substrate.

18. A display device, comprising a display panel, wherein the display panel comprises:
a color filter substrate and an array substrate disposed opposite to each other and bonded together by non-conductive sealant;
wherein the display panel comprises a display area and a non-display area around the display area,
wherein the color filter substrate comprises a first display area corresponding to the display area of the display panel and a first non-display area corresponding to the non-display area of the display panel,
wherein the first non-display area of the color filter substrate comprises:
at least two pressure sensors disposed either on a side facing or a side facing away from the array substrate, wherein each of the at least two pressure sensors comprises a signal input terminal and a signal output terminal;
a plurality of power supply signal input lines, wherein each of the plurality of power supply signal input lines is electrically connected to a respective one of the signal input terminals of the at least two pressure sensors;
a plurality of pressure signal output lines, wherein each of the plurality of pressure signal output lines is electrically connected to a respective one of the signal output terminals of the at least two pressure sensors;
a plurality of first signal input terminals electrically connected to the plurality of power supply signal input lines in one-to-one correspondence; and
a plurality of first signal output terminals each electrically connected to one of the plurality of pressure signal output lines in an one-to-one correspondence;
wherein the plurality of first signal input terminals and the plurality of first signal output terminals are disposed on a same side of the color filter substrate as the at least two pressure sensors; and
wherein the array substrate comprises a second display area corresponding to the display area of the display panel and a second non-display area corresponding to the non-display area of the display panel, wherein the second non-display area of the array substrate facing the first non-display area of the color filter substrate comprises:
a plurality of second signal input terminals electrically connected to the plurality of first signal input terminals in an one-to-one correspondence; and
a plurality of second signal output terminals electrically connected to the plurality of first signal output terminals in an one-to-one correspondence.

* * * * *